United States Patent [19]

Ito et al.

[11] 4,373,552
[45] Feb. 15, 1983

[54] ELECTROMAGNETIC FLOW CONTROL VALVE ASSEMBLY

[75] Inventors: Shoji Ito, Nagoya; Motonobu Akagi, Kariya, both of Japan

[73] Assignee: Aisin Seiki Kabushiki Kaisha, Kariya, Japan

[21] Appl. No.: 203,517

[22] Filed: Nov. 3, 1980

[30] Foreign Application Priority Data

Nov. 8, 1979 [JP] Japan .................. 54-145673

[51] Int. Cl.³ .............. F16K 11/04; F16K 31/08
[52] U.S. Cl. .................. 137/625.48; 137/870
[58] Field of Search ............. 137/625.48, 625.12, 137/870

[56] References Cited

U.S. PATENT DOCUMENTS 1,202,895 10/1916 Rogers .................. 137/870 X
2,394,105 2/1946 Rice .................... 137/870
2,637,343 5/1953 Matthews .
2,675,831 4/1954 Jacques ................ 137/625.48
3,099,280 7/1963 Holzbock .
3,984,745 10/1976 Minalga .
4,254,754 3/1981 Takada et al. ........ 137/625.48 X
4,294,286 10/1981 Ohumi ................. 137/625.48

Primary Examiner—Arnold Rosenthal
Attorney, Agent, or Firm—Finnegan, Henderson, Farabow, Garrett & Dunner

[57] ABSTRACT

An electromagnetic flow control valve assembly comprising a valve body including an inlet port and a plurality of outlet ports, and a valve in said body for controlling fluid communication between the inlet port and the outlet ports; the valve including a plurality of individual passages, each of the passages being in fluid communication with a corresponding one of the outlet ports, a plurality of individual apertures, individual ones of the apertures corresponding to each of the passages for establishing fluid communication between the passages and the inlet port; a hollow iron core disposed in the valve body, an axially movable bobbin slidably mounted on the core, and a coil disposed about the bobbin for simultaneously controlling fluid flow from the inlet port through the apertures in response to electric current applied to the coil.

5 Claims, 3 Drawing Figures

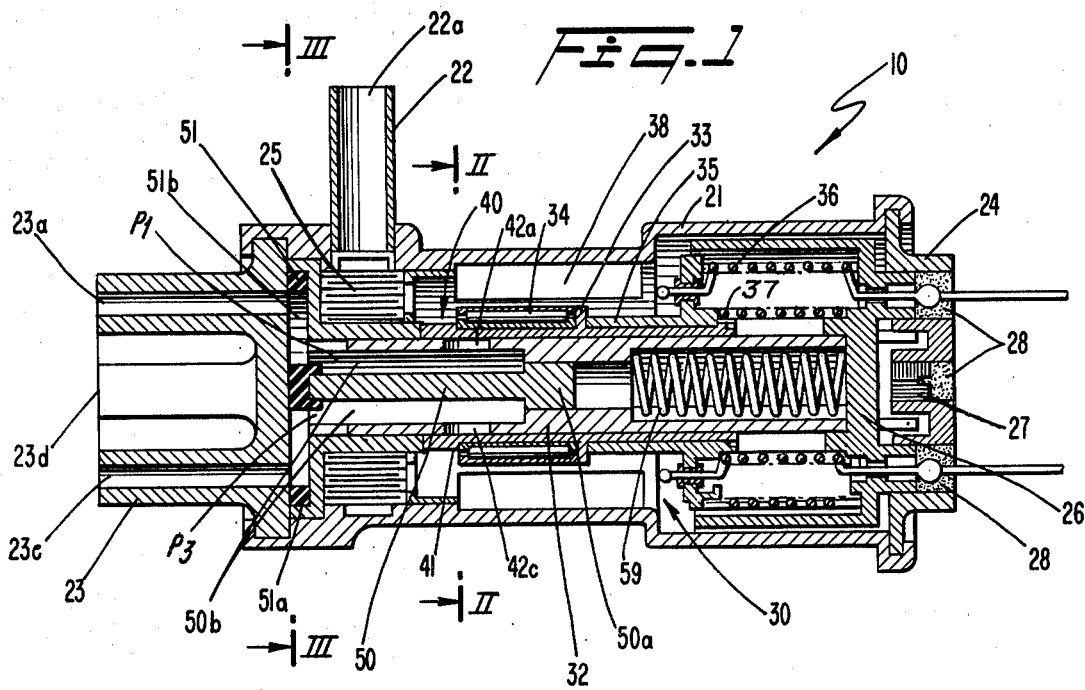
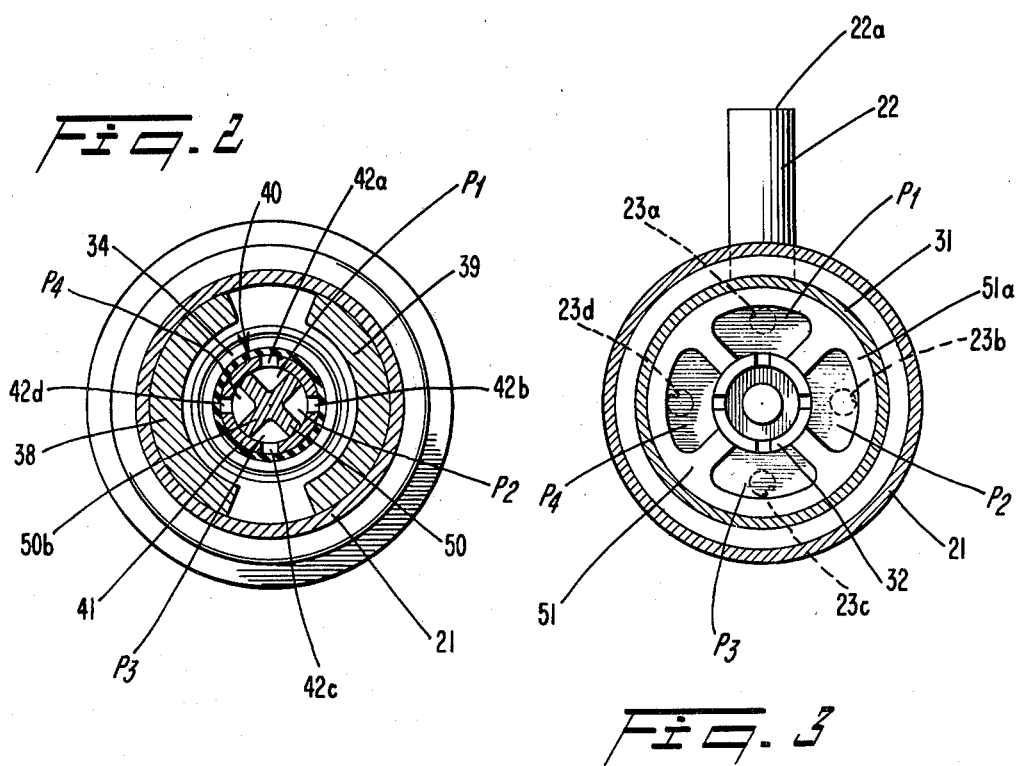

ELECTROMAGNETIC FLOW CONTROL VALVE ASSEMBLY

BACKGROUND OF THE INVENTION

1. Field of the Invention

The invention relates to an electromagnetic flow control valve assembly which comprises an electromagnetic motor controlled in proportion to applied current flow, and valve means for controlling the communication between the inlet port and the outlet port in response to movement of the electromagnetic motor.

2. Description of the Prior Art

A conventional valve assembly is provided with only a single outlet port. Therefore, a problem has been encountered when a plurality of pneumatically operated devices are to be simultaneously supplied with controlled air. In a conventional valve assembly, a plurality of valve assemblies have to be provided in order to meet such a requirement.

As a consequence, the conventional practice involves a high cost and requires a large amount of space to accommodate multiple valve assemblies.

Accordingly, it is a primary object of this invention to reduce the cost of producing and operating a valve assembly having a plurality of outlet ports.

It is a further object of the present invention to provide a single, more compact valve assembly for simultaneously controlling the flow of fluid to a plurality of fluid responsive devices.

Additional objects and advantages of the invention will be set forth in part in the description which follows, and in part will be obvious from the description, or may be learned by practice of the invention. The objects and advantages of the invention may be realized and attained by means of the intrumentalities and combinations particularly pointed out in the appended claims.

SUMMARY OF THE INVENTIOn

To achieve the foregoing objects and in accordance with the purpose of the invention, as embodied and broadly described herein, the electromagnetic flow control valve assembly of this invention comprises a valve body including an inlet port and a plurality of outlet ports, and valve means in the body for controlling fluid communication between the inlet port and the outlet ports. The valve means includes a plurality of individual passages, each of the passages being in fluid communication with a corresponding one of the outlet ports; a plurality of individual apertures, one of the apertures corresponding to each of the passages for establishing fluid communication between the passages and the inlet port; and axially movable bobbin means for simultaneously controlling fluid flow from the inlet port through the apertures in response to electric current applied to the bobbin means.

Preferably, the bobbin means includes a hollow iron core disposed in the valve body; a bobbin slidably mounted on the core; a coil disposed about the bobbin; and a pair of permanent magnets fixed in the valve body for exposing the coil to a substantially perpendicular magnetic field. It is also preferred that the bobbin means include biasing means for urging the bobbin in one axial direction, the electric current for urging the bobbin against the bias of the biasing means in the other axial direction.

Preferably also, the core includes a peripheral wall, the apertures being located in the wall, and the apertures being opened and closed by the axial movement of the bobbin on the core.

The invention provides a valve assembly which will obviate the conventional drawbacks.

The main features of the invention reside in the structure which provides a plurality of outlet ports and a plurality of passages which connect the outlet ports to apertures in the valve assembly.

BRIEF DESCRIPTION OF THE DRAWINGS

The accompanying drawings, which are incorporated in and constitute a part of this specification, illustrate one embodiment of the invention and, together with the description, serve to explain the principles of the invention.

Of the drawings:

FIG. 1 is a longitudinal sectional view of one embodiment of the invention;

FIG. 2 is a section taken along line II—II of FIG. 1; and

FIG. 3 is a section taken along line III—III of FIG. 1.

DETAILED DESCRIPTION OF THE PREFERRED EMBODIMENT

Reference will now be made in detail to the present preferred embodiment of the invention, an example of which is illustrated in the accompanying drawings. In accordance with the invention, the electromagnetic flow control valve assembly comprises a valve body including an inlet port and a plurality of outlet ports, and valve means in the body for controlling fluid communication between the inlet port and the outlet ports. The valve means includes a plurality of individual passages, each of the passages being in fluid communication with a corresponding one of the outlet ports; a plurality of individual apertures, individual ones of the apertures corresponding to each of the passages for establishing fluid communication between the passages and the inlet port; and axially movable bobbin means for simultaneously controlled fluid flow from the inlet port though the apertures in response to electric current applied to the bobbin means.

As embodied herein, and as best shown in FIG. 1, the electromagnetic flow control valve assembly 10 includes a sleeve body 21 of magnetic material in which are air-tightly secured a tube 22 having an air inlet port 22a, a cap 23 having air outlet ports 23a–23d, and a cover 24 made of magnetic material. Within the body 21 is an air filter 25.

As here embodied, the bobbin means includes an electromagnetic motor 30 comprising a cylindrical magnetic yoke 31 located between the body 21 and the cap 23 and a hollow iron core 32 located between the yoke 31 and the cover 24 and urged to move left by a coil spring 59. The right end of the spring 59 engages an insulated holder 26. A bobbin 33 is slidably mounted on the core 32, and an electrical coil 34 is disposed on the bobbin 33. A pair of conductive coil springs 36, 37 engage with an insulated holder 35 at the left end thereof, and with the holder 26 at a right end thereof thereby urging the bobbin 33 to move leftward. A pair of permanent magnets 38, and 39 are fixed on the body 21 to permit the magnetic flux to pass substantially perpendicularly relative to the coil 34. The left end of each coil spring 36, 37 is connected to a lead line of the coil 34 while each right end thereof is connected to the lead wire. Thus, the axial movement of the bobbin 33 is controlled in accordance with the electric current flow applied to the coil 34 passing the lead wire and the coil springs 36, 37. The axial movement of the holder 26 may adjust the exerting force of the springs 36, 37 by means of the screw 27. Seals 28 are plugged in the opening of the cover 24 after such adjustment.

As here embodied, the valve means further includes a valve device 40 comprising an annular valve 41 of one part of the bobbin 33 and apertures 42a–42d (FIG. 2) to be closed by inlet port 22a and the outlet ports 23a–23d in response to the axial movement of the bobbin 33. The apertures 42a–42d are provided on the peripheral wall of the core 32 at an equal distance from each other and are simultaneously controlled to change the area thereof by the valve 41. Passages P1–P4 are distinctly provided to connect the four outlet ports 23a–23d with the apertures 42a–42d by means of a partition member 50 and a seal member 51 (FIGS. 2 and 3). The partition member 50 is air-tightly fitted in the core 32, and includes a head 50a and cross-shaped wings 50b. The seal member 51 is provided between the cap 23 and the yoke 31, the core 32 and the partition member 50, and comprises an annular portion 51a and cross-shaped walls 51b.

When no current flow is applied to the coil 34, the bobbin 33 is in abutment with the right end of the yoke 31 due to leftward urging of the springs 36, 37. This closes the entire area of apertures 42a–42d by the valve 41. Thus, the outlet ports 23a–23d are isolated from the inlet port 22a. When the current flow is applied to the coil 34, the bobbin 33 slides to the right against the bias of springs 36, 37 in accordance with the value of the current. This increases the opened area of apertures 42a–42d. Therefore, the air admitted from the inlet port 22a is transmitted to the passages P1–P4 after control of the flow quantity at the apertures 42a–42d. The air then passes to the outlet ports 23a–23d which are pneumatically connected to various devices.

According to the valve assembly 10, a plurality of the devices (four in this embodiment) are supplied simultaneously with the air, the flow quantity of which is controlled. In addition, the valve assembly 10 includes a single valve 41 to be moved by the electromagnetic motor 30, thereby enabling inexpensive and compact manufacture. The size or shape of the apertures 42a–42d may be different from each other in modified embodiments of the invention. Alternatively, the apertures may be provided in misalignment to each other to thereby change the open-close timing of each aperture.

It will be apparent to those skilled in the art that various modifications and variations could be made in the invention without departing from the scope or spirit of the invention.

We claim:
1. An electromagnetic flow control valve assembly comprising:
   a valve body including an inlet port and a plurality of outlet ports; and
   valve means in said body for controlling fluid communication between said inlet port and said outlet ports;
   said valve means including a hollow iron core having a peripheral wall, a plurality of individual passages, each of said passages being in fluid communication with a corresponding one of said outlet ports;
   a plurality of individual apertures in said peripheral wall, one of said apertures corresponding to each of said passages for forming a fluid path between each of said outlet ports and said inlet port; and
   bobbin means including a bobbin slidably mounted on the core for simultaneously and linearly controlling fluid flow between said inlet port and all of said plurality of outlet ports through said plurality of apertures in response to electric current applied to said bobbin means, said bobbin for moving axially between one position wherein said fluid paths are all closed by said bobbin, and a second position wherein said apertures are uncovered for opening all of said fluid paths.

2. The valve assembly of claim 1 wherein said bobbin means also includes:
   a coil disposed about the bobbin; and
   a pair of permanent magnets fixed in said valve body for exposing the coil to a substantially perpendicular magnetic field.

3. The valve assembly of claim 2 wherein said bobbin means also includes biasing means for urging said bobbin in one axial direction, said electric current for urging said bobbin against the bias of said biasing means in the other axial direction.

4. The valve assembly of claim 3 wherein said valve body includes a cap at one end and a cover on the other end, said valve means also including a cylindrical magnetic yoke mounted in said body between said cap and said core, and a coil spring mounted in said body for urging said core in said one direction.

5. The valve assembly of claim 4 wherein said biasing means includes a pair of conductive coil springs, said conductive springs forming a portion of the electric circuit for supplying current to said coil.

* * * * *